Figure 1:
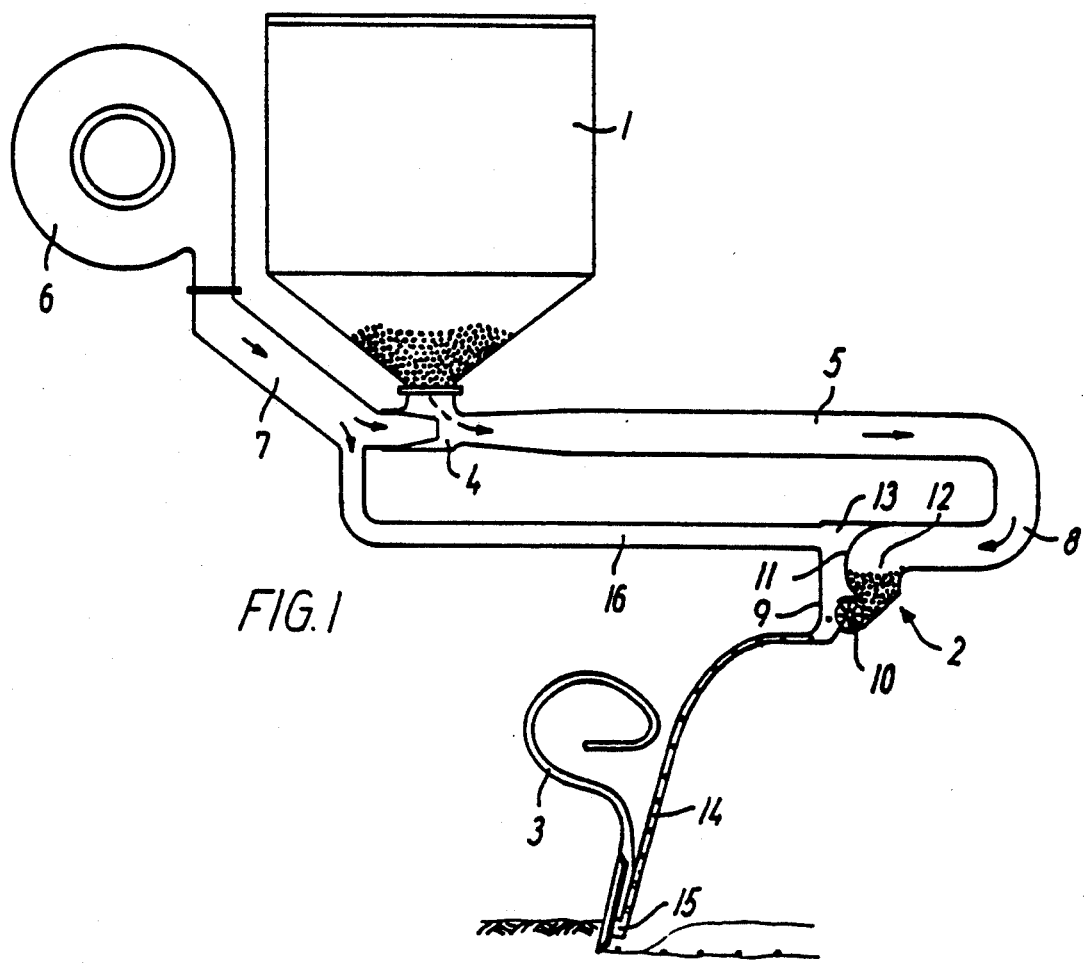

United States Patent [19]
Andersen

[11] Patent Number: 5,156,102
[45] Date of Patent: Oct. 20, 1992

[54] APPARATUS FOR SOWING GRANULAR MATERIAL

[75] Inventor: Helge H. Andersen, Soro, Denmark

[73] Assignee: Kongskilde Maskinfabrik A/S, Soro, Denmark

[21] Appl. No.: 436,882

[22] Filed: Nov. 16, 1989

[30] Foreign Application Priority Data

Nov. 16, 1988 [DK] Denmark .............................. 6389/88

[51] Int. Cl.$^5$ ......................... A01C 7/20; B65G 53/16
[52] U.S. Cl. ...................................... 111/175; 406/68; 406/65; 406/41; 406/109; 111/176; 111/178; 111/77
[58] Field of Search ................. 111/174, 175, 176, 34, 111/77; 221/211, 278, 264-266; 406/109, 68, 65

[56] References Cited

U.S. PATENT DOCUMENTS

| 3,010,766 | 11/1961 | Coski | 406/109 X |
| 3,155,431 | 11/1964 | Baldwin | 406/65 X |
| 4,572,726 | 2/1986 | Van Abbema | 406/109 X |

FOREIGN PATENT DOCUMENTS

| 287440 | 11/1970 | U.S.S.R. | 111/176 |
| 6565573 | 4/1979 | U.S.S.R. | 111/174 |
| 843810 | 7/1981 | U.S.S.R. | 111/174 |
| 1177761 | 1/1970 | United Kingdom | 111/175 |
| 8703166 | 6/1987 | World Int. Prop. O. | 111/174 |

*Primary Examiner*—Danton D. DeMille
*Attorney, Agent, or Firm*—Browdy and Neimark

[57] ABSTRACT

An apparatus for sowing granular material, particularly in combination with a harrow, including a storage hopper (1) which at its outlet is provided with at least one injector (4) operated by a blower (6) and connected with a transport conduit (5) leading to a number of seed shares (15) and provided with a cam or cellular wheel for metering the granular material, the transport conduit (5) being connected with a metering device (2) divided by a perforated plate (11) into a granulate compartment (12) communicating with the conduit (5) and an air compartment (13) from which hoses (14) extend to their respective seed share (15) and which over cam or cellular wheels (10) is in communication with the granulate compartment (12) and through a conduit (16) is connected with the blower (6) in front of the injector (4).

4 Claims, 2 Drawing Sheets

APPARATUS FOR SOWING GRANULAR MATERIAL

The apparatus relates to a sowing machine of the type outlined in the preamble of claim 1. In this respect, the term sowing must be broadly conceived, i.e. as a distribution of a granular material, e.g. seed or fertilizer in a field. Bearing this in mind, and for the sake of convenience, the granular material will in the following be called seed grain.

Sowing machines of this type are known in various designs. In a known machine the dosage is metered before the seed grain is passed through the injector upwards through a vertical tube into a distributor head without movable parts, from which hoses extend to a respective one of the seed shares. A considerable drawback of this machine is that the counter-pressure in all said hoses must be the same in order to obtain a uniform distribution of the seed grain between the seed shares. In another similar machine the distributor head is provided with rotating parts forcing the seed grain down into each individual hose.

DE-OS No. 3 530 514 discloses a pneumatic single-grain sowing apparatus in which corn to be sown is conveyed from the bottom of a storage hopper to hoses through which the corn is pneumatically fed to seed shares, the conveyance being provided in that the corn is retained by holes in the cylinder jacket surface of a hollow drum by virtue of an internal pressure below atmospheric.

It is advantageous to effect sowing in unison with harrowing. This provides for saving an operational step (overrun of the field) and the seed grain is put quite correctly into the ground, viz. on the surface of a non-processed layer through which capillary forces can pull up water for the seed grain and under a processed layer allowing air and heat to penetrate down into it.

Modern harrows are frequently divided into sections and they are thus collapsible in order to obtain a large pass width and a small pass width in case of road transport to which the law sets limits to the maximum allowable width.

None of the prior sowing machines is fitted to be assembled with such a harrow and the object of the invention is therefore to provide an apparatus of the above mentioned type which may be combined with a harrow without setting bounds to its width which does not prevent or impede the collapsibility of the harrow and which is not sensitive to the counter-pressure in the hoses leading down to the seed shares.

This is obtained by a sowing apparatus having the characteristic features claimed in claim 1.

A combination of this sowing apparatus and a sectionally divided harrow provides for mounting a metering device on each section of the harrow and the hoses feeding the seed grain from the metering device are passed down at the rear of their respective harrow tine. The metering devices may be designed so compact that they do not hamper the collapsing of the harrow. Various features of preferred embodiments appear from the dependent claims 2 to 4.

Figure 2:
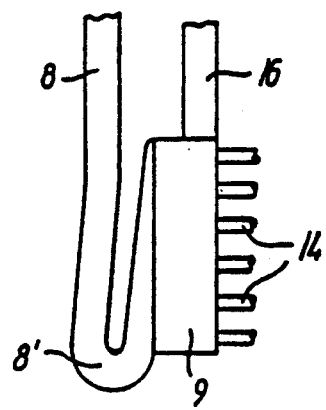

The invention will now be described in more detail with reference to the drawings, in which FIG. 1 is a schematical view of the principal structure of a sowing apparatus according to the invention, and FIG. 2 is a top plan view of the metering device of the apparatus connected with associated conduits for granulate and air.

Figure 3:
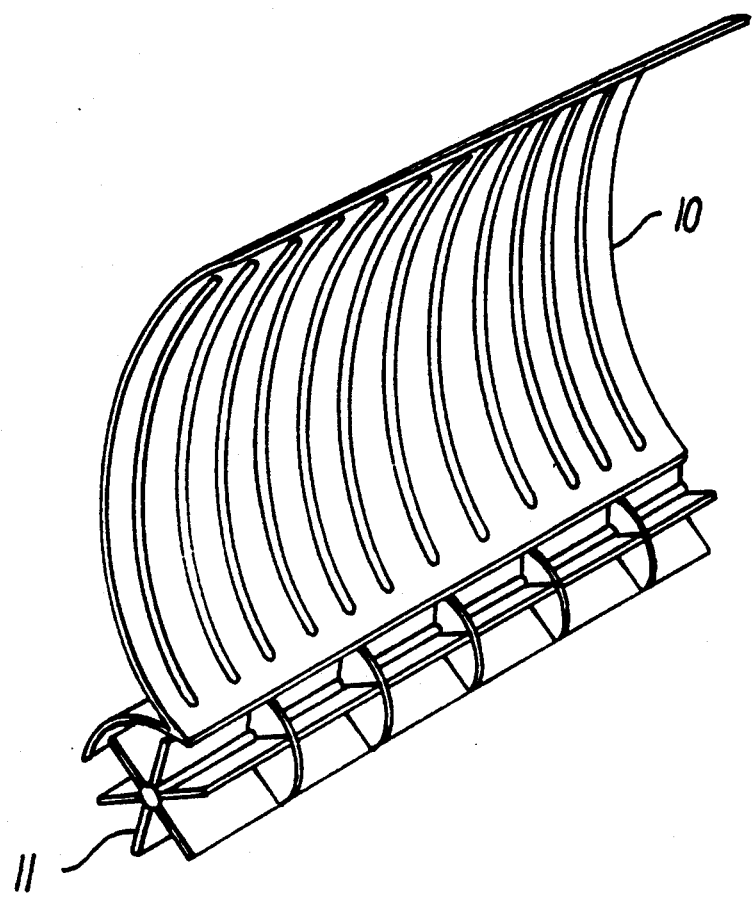

FIG. 3 is a schematic perspective view of the perforated plate and cam wheel shown in the end view of FIG. 1.

A sowing apparatus with pneumatic transport and accurate metering of the seed grain includes a storage hopper 1 suitably mounted on a tractor carrying the sowing apparatus. Seed grain is pneumatically transferred from hopper 1 to a number of metering devices 2 from which it is passed further to seed shares which in the illustrated example are combined with a respective harrow tine 3.

This pneumatical conveyance from storage hopper 1 to metering devices 2 is effected by means of injectors 4 positioned beneath storage hopper 1 and sucking out the seed grain therefrom, following which they blow the seed grain through a respective transport conduit 5 to a metering device 2. Through flow passages 7 injectors 4 receive air from a blower 6 driven by the power take-off of the tractor.

Each metering device 2 includes an inlet 8 and a metering chamber 9. The metering chamber accommodates a shaft on which a series of cam wheels 10 are disposed side by side, as shown in FIG. 3, and adjacent to the bottom of the metering chamber 9, as shown in FIG. 1. A perforated plate 11 together with cam wheels 10 divides the metering chamber 9 into a granulate compartment 12 and an air compartment 13. The perforated plate 11 follows a uniformly curved cylinder surface the generatrices of which are parallel to the cam wheel shaft and which is concave towards the granulate compartment 12. The perforation, shown in FIG. 3, preferably consists of slots 17 extending along the curvature of the plate, i.e. transverse of the generatrix direction.

Metering chamber 9 is elongated in the direction of the cam wheel shaft and inlet 8 may appropriately be connected to the side of the chamber as roughly illustrated in FIG. 2, i.e. through a horizontal curvature 8' of 180° at the end of the chamber from which the width of the inlet uniformly declines towards the other end of the chamber.

From the air compartment 13 of metering chamber 9 seed hoses 14 extend from each cam wheel to a respective seed share 15. Moreover, an air conduit 16 extends from the air duct 7 in front of injector 4 to the air compartment 13 of metering chamber 9.

The sowing apparatus operates as follows: When blower 6 is started and the granulate compartment of metering device 2 is empty, injector 4 sucks seed grain out of storage hopper 1. The seed grain is together with air blown through the transport conduit 5 to the metering device 2. Immediately before the entry to metering chamber 9, viz. in curvature 8', the seed grain is slowed down almost in the same manner as in a cyclone, following which it deposits in granulate compartment 12 of metering chamber 9 while dispersing uniformly throughout the length of the chamber.

Injector 4 is dimensioned so that it is self-controlling, i.e. it comes to a standstill or stops sucking seed grain out of storage hopper 1 if the counter-pressure in transport conduit 5 gets too high. This takes place when the metering device is approximately filled. At the time when the injector comes to a standstill the air flow in transport conduit 5 is still strong enough to maintain pneumatic transport therein, thereby involving no risk of obstructing transport conduit 5.

A 12 V DC motor, not shown, that is selected for each metering device and is electronically controlled in dependence of travelling speed and other actual parameters is during sowing driving the cam wheel shaft and thus also cam wheels 10 which are thereby caused to meter a specific amount of seed grain from the granulate compartment 12 of the metering chamber to a respective one of the sowing hoses 14 in air compartment 13. Thus, equilibrium between the supplied and metered amount of seed grain is obtained so that the metering chamber is scarcely filled. The seed grain which by the cam wheels is fed to air compartment 13 of the metering device is pneumatically conveyed through sowing hoses 14 to seed shares 15. The air conduit 16 ensures that the flow of air is sufficient for the conveyance in case the granulate compartment 12 of the metering device is filled and, consequently, the air flow through transport conduit 5 is small. Air conduits 16 have such small dimensions that they do not by their presence obstruct the functioning of injectors 4.

When the sowing operation has to be temporarily interrupted, e.g. in case of turning round the vehicle at the end of the field, the motor driving the cam wheel is simply stopped. Thereby, the metering from the granulate compartment to the air compartment is stopped, the metering chamber is filled and then the inlet is partially filled, following which the injector stops because the counter-pressure in transport conduit 5 increases too much. Upon resumption of sowing, the motor of cam wheel shaft is started again, the seed grain accumulated in the inlet of the metering device is consumed and the injector starts operating again when the counter-pressure in transport conduit 5 has decreased sufficiently. The inlet is formed so that it is blown completely clear by such a restart, i.e. there are no corners where the seed grain can be left.

In metering chamber 2 the seed grain flows on its way towards cam wheels 10 down across the perforated plate 11 along the slots due to their orientation. Thereby, corn or other particles that are about to be stuck in the slots are swept away, and the passage of the air through the perforated plate is ensured.

As mentioned, the sowing apparatus may be combined with a sectionally divided harrow that is collapsible, e.g. with respect to road transport.

Due to the metering devices 2 decentralized storages are then provided which are continuously filled up from the main charge in storage hopper 1 and the metering devices 2 may be made suitably small so that they do not hamper the collapsing of the harrow. The function of the metering devices is not hampered by the fact that they are turned round when the sowing has been stopped. Thus, the sowing of a field may be terminated and the seed sowing stopped, the harrow can be collapsed and the vehicle driven to another field where the harrow is unfolded and the sowing immediately resumed.

It should be observed that the cam wheel shafts of the metering devices or in some of them may suitably be divided so that some of the cam wheels may be fixed during the sowing operation. Strips are then left in which no seed is scattered and which may be used as wheel tracks or marking in respect of later overrun of the field, e.g. in case of crop spraying.

I claim:

1. An apparatus for sowing granular material comprising, a storage hopper (1) with an outlet provided with at least one injector (4) operated by a blower (6) having a suction side and a pressure side, said injector (4) connected with one end of a transport conduit (5) leading to a metering device (2) comprising a metering chamber (9), said metering chamber (9) divided by a perforated plate (11) and a rotary meter (10) into a granulate compartment (12) and an air compartment (13), said rotary meter having a horizontal rotatable shaft, said granulate compartment (12) communicating with the other end of the transport conduit (5), said air compartment having sowing hoses (14) which extend to corresponding seed shares (15), said air compartment (13) including an air conduit (16) connected with the pressure side of said blower (6) upstream from said injector (4).

2. A sowing apparatus as claimed in claim 1, wherein said rotary meter further comprises a plurality of cam wheels (10) mounted side by side on said horizontal rotatable shaft, said metering device (2) being elongated in the direction of said horizontal rotatable shaft, wherein each cam wheel of said plurality of cam wheels meters granular material into a corresponding sowing hose (14) when said horizontal rotatable shaft is rotated.

3. A sowing apparatus as claimed in claim 2, wherein the perforated plate (11) of the metering device (2) follows a cylindrical surface the generatrix direction of which is parallel to said horizontal rotatable shaft and which is concave towards the granulate compartment (12), and the perforation of the plate includes slots extending substantially transverse of the generatrix direction of the plate.

4. A sowing apparatus as claimed in claim 3, wherein the metering device (2) is elongated and has two ends, the transport conduit (5) is connected with the metering device (2) through an inlet (8), and the transport conduit (5) for the granular material at its inlet (8) to the metering device (2) has a curvature (8') of about 180° immediately before the entry to the metering device at the one end of the latter.

* * * * *